(12) United States Patent
Epple

(10) Patent No.: US 11,703,674 B2
(45) Date of Patent: Jul. 18, 2023

(54) IMMERSION OBJECTIVE

(71) Applicant: Carl Zeiss Microscopy GmbH, Jena (DE)

(72) Inventor: Alexander Epple, Aalen (DE)

(73) Assignee: Carl Zeiss Microscopy, Jena (DE)

( * ) Notice: Subject to any disclaimer, the term of this patent is extended or adjusted under 35 U.S.C. 154(b) by 413 days.

(21) Appl. No.: 16/933,735

(22) Filed: Jul. 20, 2020

(65) Prior Publication Data

US 2021/0026124 A1    Jan. 28, 2021

(30) Foreign Application Priority Data

Jul. 26, 2019 (DE) .......................... 102019211179.3

(51) Int. Cl.
    *G02B 21/00*      (2006.01)
    *G02B 21/33*      (2006.01)
    *G02B 21/02*      (2006.01)

(52) U.S. Cl.
     CPC ......... *G02B 21/33* (2013.01); *G02B 21/0072* (2013.01); *G02B 21/025* (2013.01)

(58) Field of Classification Search
CPC .. G02B 21/33; G02B 21/0072; G02B 21/025; G02B 21/02; G02B 13/00; G02B 17/061; G02B 17/0832; G02B 17/0844; G02B 17/0888; G02B 27/01; G02B 27/0103; G02B 27/017; G02B 27/0905; G02B 27/0944; G02B 27/0977; G02B 27/12; G02B 27/143; G02B 27/288; G02B 27/4233; G02B 27/64; G02B 3/0075; G02B 30/27; G02B 30/36; G02B 5/0883; G02B 5/0891; G02B 5/128; G02B 5/132; G02B 5/1819

See application file for complete search history.

(56) References Cited

U.S. PATENT DOCUMENTS

| | | | |
|---|---|---|---|
| 2003/0058777 A1* | 3/2003 | Martynov | G11B 7/122 |
| 2006/0088745 A1 | 4/2006 | Kanno | |
| 2008/0106795 A1 | 5/2008 | Shi et al. | |
| 2012/0188660 A1 | 7/2012 | Fahlbusch et al. | |
| 2013/0100537 A1 | 4/2013 | Matthae et al. | |
| 2016/0370709 A1* | 12/2016 | Loering | G03F 7/7015 |
| 2017/0307860 A1* | 10/2017 | Pretorius | G02B 21/33 |
| 2018/0307021 A1* | 10/2018 | Schulz | G02B 27/0037 |

FOREIGN PATENT DOCUMENTS

| | | |
|---|---|---|
| DE | 10 2004 051 357 B4 | 4/2006 |
| DE | 10 2006 052 142 B4 | 5/2008 |
| DE | 10 2011 117 743 A1 | 7/2012 |
| DE | 10 2011 116 757 A1 | 4/2013 |
| DE | 10 2017 108 595 B3 | 5/2018 |

OTHER PUBLICATIONS

German Search Report, with translation thereof, for corresponding DE Appl No. 10 2019 211 179.3, dated Mar. 9, 2020.

* cited by examiner

*Primary Examiner* — Mustak Choudhury
(74) *Attorney, Agent, or Firm* — Fish & Richardson P.C.

(57) ABSTRACT

An immersion objective includes a correction group or correcting a spherical aberration. The displacement of the correction group along the optical axis leads to a substantially negligible defocus aberration.

21 Claims, 4 Drawing Sheets

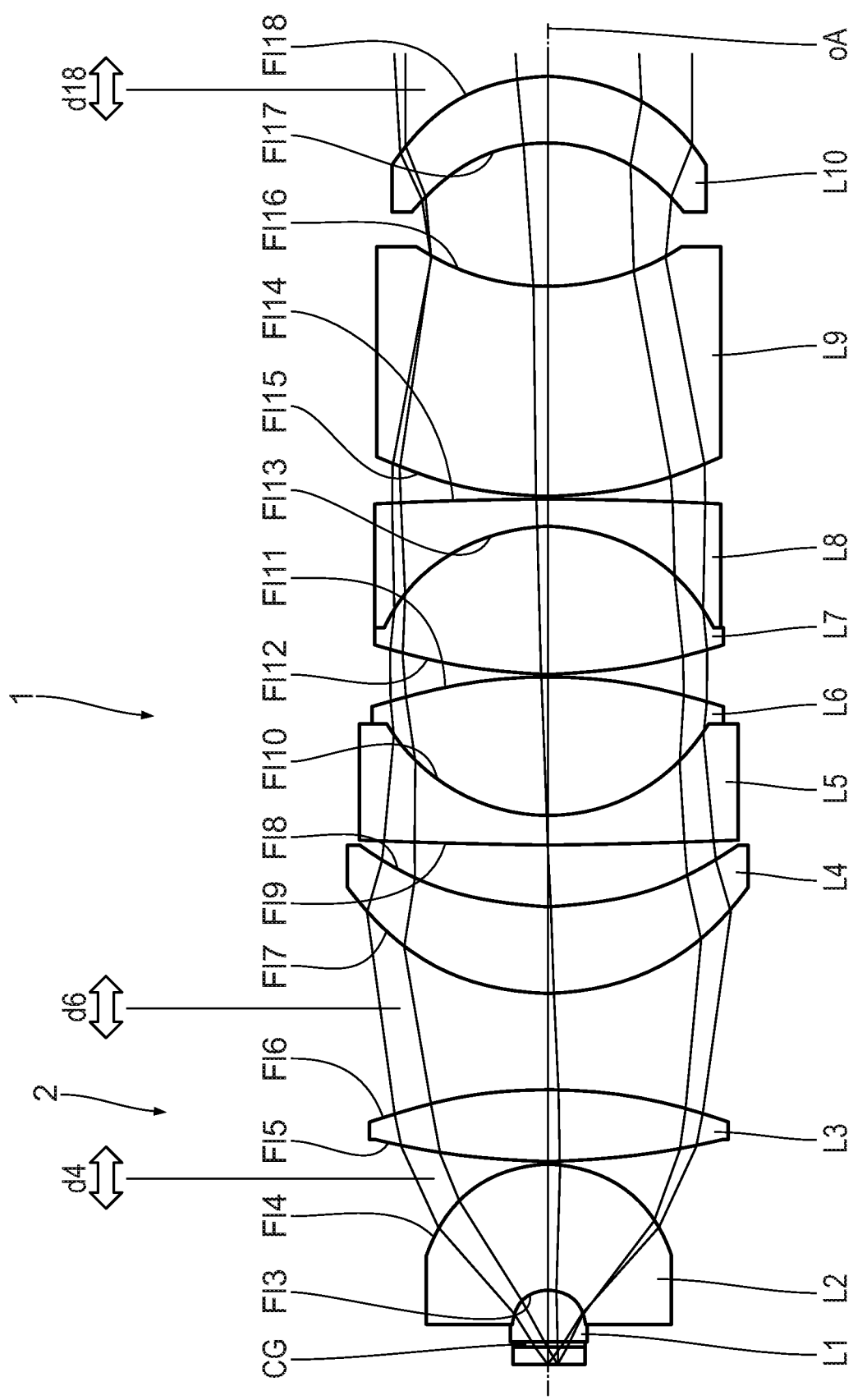

IMMERSION OBJECTIVE

CROSS-REFERENCE TO RELATED APPLICATIONS

This application claims benefit under 35 U.S.C. § 119 to German Application No. 10 2019 211 179.3, filed Jul. 26, 2019. The contents of this application is hereby incorporated by reference in its entirety.

FIELD

The disclosure relates to an immersion objective for use with different immersion media. Additionally, the disclosure relates to a microscope having such an immersion objective.

Further, the disclosure relates to a method for setting a microscope, such as for adapting a microscope to changes in the object space.

BACKGROUND

Numerous embodiments of immersion objectives are known, including immersion objectives having a correction group for correcting the spherical aberration. Reference is made by way of example to DE 102011117743 A1 and DE 102017108595 B3.

SUMMARY

The disclosure seeks to provide an improved an immersion objective having a correction group.

In a general aspect, the disclosure provides an immersion objective for a microscope for use with different immersion media. The immersion objective includes a plurality of lenses arranged along an optical axis. At least one correction group includes one or more of the lenses displaceable along the optical axis. The immersion objective has a working distance that is dependent on the immersion medium and/or any cover glass that may be used. Aberrations of a wavefront coming from an axis point can be described by Zernike polynomials with Zernike coefficients. The Zernike coefficients Z4 and Z9 have a sensitivity with respect to a displacement of the at least one correction group, for which $|Z4_{sens}:Z9_{sens}|<1$.

The disclosure relates to embodying an immersion objective such that a displacement of the correction group for correcting spherical aberration leads to a substantially negligible defocus aberration. When describing the aberrations with the aid of a Zernike decomposition of the aberrated wavefront, the spherical aberration is substantially given by the coefficient Z9 (while initially neglecting the terms Z16, Z25 . . . of the higher-order spherical aberration), and the defocus is given by the coefficient Z4. A defocus aberration (or simply: defocus) that is negligible compared to the spherical aberration then expresses itself by way of a small ratio of the sensitivity of the Zernike coefficients Z4 and Z9 of the displacement position of the correction group. In some embodiments, $|Z4_{sens}:Z9_{sens}|<1$ (e.g., $|Z4_{sens}:Z9_{sens}|<0.5$, $|Z4_{sens}:Z9_{sens}|<0.3$, $|Z4_{sens}:Z9_{sens}|<0.2$, $|Z4_{sens}:Z9_{sens}|<0.1$, $|Z4_{sens}:Z9_{sens}|<0.05$, $|Z4_{sens}:Z9_{sens}|<0.03$, $|Z4_{sens}:Z9_{sens}|<0.02$), denotes here the change (sensitivity) of the i-th Zernike coefficient for describing the aberration of a wavefront coming from an axis point in the case of a displacement of the correction group. It is the derivative of the corresponding Zernike coefficient Zi after the displacement of the correction group $Zi_{sens}=\delta Zi/\delta d_x$, wherein $d_x$ is one of the variable air spaces.

The disclosure realizes that such a design is possible as long as it is permitted that the objective has a working distance that is dependent on the optical properties (refractive index) of the immersion medium and the presence of a cover glass. The immersion objectives according to the disclosure can have a variable working distance. The working distance is here understood to mean the thickness of the immersion layer, so that the system is focused. The displacement position of the correction group in turn can serve for adaptation to the optical properties in the object space, such as to the refractive index of the immersion medium used and possibly of other details of the object space, for example the properties of a cover glass used, such as the thickness and/or refractive index thereof. That means the working distance is directly dependent on the refractive index of the immersion medium used and possibly on other details of the object space, for example the properties of a cover glass used, such as the thickness and/or refractive index thereof.

According to the disclosure, it has been found that in the case of an objective having a constant working distance, a displacement of a correction group for the correction of a spherical aberration can result in a defocus. Correcting the spherical aberration while at the same time optimizing the focus setting can therefore be difficult. Fine control for maximizing the image quality can involve actuation of both the correction group and the focus drive.

The design of the immersion objectives according to the disclosure can permit a significantly simplified procedure for maximizing the image quality, such as a significantly simplified procedure for maximizing the contrast of the image.

The design according to the disclosure can allow a correction of the spherical aberration, such as a maximization of the image contrast, for example by a displacement of the correction group, without the need to simultaneously or subsequently refocus. This significantly can simplify the method for setting the microscope to achieve maximum image contrast. It can simplify, for example, an automated setting of the microscope to achieve maximum image contrast.

The correction group can have a coarse setting option for pre-setting the immersion objective for the use of a specific immersion medium. The immersion objective can have a setting option for the fine control of the compensation, that is to say for precisely displacing the correction group along the optical axis. This makes it possible to adapt the immersion objective precisely to the actual conditions in the object space. The exact optical properties of the elements in the object space, such as of the immersion medium, can be dependent on the temperature, for example. They can also depend on the exact details of a cover glass that might be used. These factors can mean that fine adjustment of the displacement position of the correction group is involved for maximizing the image contrast.

In a general aspect, the disclosure provides a microscope that includes an immersion objective according to the disclosure. Features provided by such a microscope can correspond to those disclosed herein for the immersion objective.

A microscope for use of an immersion objective according to the disclosure can have one or more corresponding sensors and optionally a control device having an autofocus function and/or a contrast maximization function. The focus drive and/or the displacement of the correction group can be controllable with the aid of the control device.

In a general aspect, the disclosure provides a method for setting a microscope. The method includes the following steps: providing a microscope with a focus drive and an immersion objective having a correction group; positioning the correction group in a prescribed position for pre-setting the immersion objective; actuating the focus drive for reducing the defocus; and displacing the correction group for reducing the spherical aberration, wherein the displacement leads to an increase in the defocus aberration by at most 10% (e.g., by at most 5%, by at most 3%, by at most 2%, by at most 1%).

For positioning the correction group in a prescribed position, one or more markers that make at least coarse adaptation of the objective to specific immersion media, such as to immersion media having specific refractive indices, possible can be provided on the immersion objective. The immersion objective can thus be pre-set easily for use with specific immersion media.

The focus drive can be actuated such that the defocus aberration is minimized.

The correction group can be displaced such that the spherical aberration is minimized. The correction group can be displaced such that the image contrast is maximized.

In some embodiments, method according to the disclosure, another focusing, such as post-focusing, is not necessary after the displacement of the correction group for reducing the spherical aberration.

In some embodiments, counting the pre-setting of the immersion objective as an independent method step, the method is a three-stage method. In certain embodiments, without the pre-setting, the method is a two-stage method. This can be a sequential optimization method. The setting can include the steps of focusing and contrast maximizing.

The pre-setting can be implemented with the aid of a marker provided on the objective. It is possible to adapt the immersion objective in advance at least coarsely to the refractive index of the immersion medium used.

The two-stage, sequential method can be automated. This can be implemented, for example, via focusing controlled by sensor (autofocus) and contrast maximization controlled by sensor.

According to a further aspect of the disclosure, the ratio of the sensitivity of the defocus aberration of the displacement position of the correction group to the sensitivity of higher-order spherical aberrations of the displacement position of the correction group is also at most as great as a maximally specified limit value. In some embodiments, for the Zernike coefficients Z16 and/or Z25, $|Z4_{sens}:Z16_{sens}|<1$ (e.g., $|Z4_{sens}|:Z16_{sens}|<0.5$, $|Z4_{sens}:Z16_{sens}|<0.3$) and/or $|Z4_{sens}:Z25_{sens}|<4$ (e.g. $|Z4_{sens}:Z25_{sens}|<2$, $|Z4_{sens}:Z25_{sens}|<1$, $|Z4_{sens}:Z25_{sens}|<0.7$).

The specifications with respect to the ratio of the sensitivity of the Zernike coefficients Z4 and Z9 and/or Z16 or Z25 of the displacement position of the correction group can relate to specified immersion media. They can relate to a selection of the immersion media from the following list: water, silicone oil, glycerol, immersion oil having a refractive index>1.5, such as immersion oil having the following refractive indices: $n_{480}$: 1.523668, $n_{546}$: 1.517984 and $n_{850}$: 1.507114.

The Zernike coefficients Zi can depend on the numerical aperture NA. For example, the coefficient for defocus, Z4, can related quadratically to the numerical aperture. In some cases, $Z4/NA^2 \leq 1$ nm/μm.

According to a further aspect of the disclosure, when the at least one correction group is displaced along the optical axis, the distance thereof from the lens that is adjacent on the object side and the distance thereof from the lens that is adjacent on the image side changes.

The changes in distance can be proportional to one another. This can simplify the mechanical design of the immersion objective, for example the correction mechanism.

According to some embodiments, all lenses of the immersion objective that do not belong to the correction group remain fixed in place during the displacement of the correction group along the optical axis. In other words, the two air space movements upstream and downstream of the correction group during a displacement of the latter extend rectilinearly counter to each other. In this way, the mechanical design of the immersion objective can be further simplified.

According to certain embodiments, the immersion objective has an object-side numerical aperture of at least 0.6 (e.g., at least 0.7, at least 0.75, at least 0.8). The object-side numerical aperture can be up to 1 or, for example, up to 1.2. These specifications can relate to the use of water or of the aforementioned immersion oil as an immersion medium.

The immersion objective can have, for example, ×25 magnification.

The immersion objective can have an object field with a diameter of 0.720 mm.

The immersion objective can have an image field diameter in the range from 15 mm to 25 mm, such as from 17 mm to 20 mm.

The immersion objective can be corrected in a spectrally broadband manner. It can be corrected, for example, in the spectral range from 480 nm to 850 nm.

The immersion objective can have up to ten lenses. For example, it can four lenses of at least four (e.g., at least five, at least six, at least seven) different glass types.

The immersion objective can have one or more (e.g., two) cemented doublet elements. The cemented elements can be arranged so that they are adjacent along the optical axis. Cemented triplet elements are also conceivable. According to an aspect of the disclosure, the two outer lenses of the two cemented doublet elements are made from the same glass. The two inner lenses can be made from the same glass.

According to a further aspect of the disclosure, the correction group includes the lens L3 or a cemented doublet element with the lenses L5 and L6 or two cemented doublet elements with the lenses L4 and L5, and L6 and L7.

According to a further aspect of the disclosure, the refractive index of the correction group is at most 50 diopter (e.g., at most 30 diopter, at most 20 diopter, at most 15 diopter, at most 10 diopter).

A small refractive index of the correction group can make it possible to embody the immersion objective such that, except for the correction group, all lenses are rigid (non-displaceable).

According to an aspect of the disclosure, the front side (i.e. the side facing the object) of the first lens is a plane surface.

According to an aspect of the disclosure, at least one of the first three lenses is made from a glass having a refractive index of at least 1.60.

The concept according to the disclosure is not limited to the specific combination of numerical aperture, light wavelength, imaging scale and object size and image size. It can be generally advantageous when matching an immersion objective to variable optical properties in the object space, for example due to the use of different immersion media and/or a variation in the refractive index thereof, for example owing to temperature fluctuations, and/or use of different cover glass materials and/or cover glass thicknesses.

BRIEF DESCRIPTION OF THE DRAWINGS

Features and details of the disclosure are evident from the description of the exemplary embodiments with reference to the figures, in which:

FIG. 1 shows a schematic longitudinal section through the optical components of an objective according to a first variant, FIG. 2A to 2C schematically show the beam path at the object-side end of an objective having the correction mechanism according to the disclosure, FIG. 3 schematically shows an illustration in accordance with FIG. 1 of a further variant and FIG. 4 schematically shows an illustration in accordance with FIG. 1 of a further variant.

DETAILED DESCRIPTION

Figure 2B:
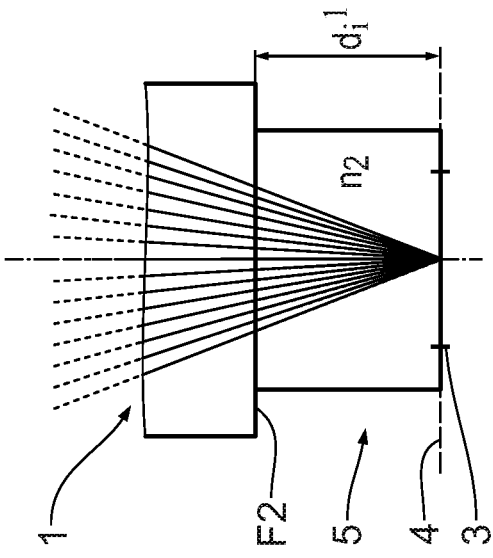

Different variants of an immersion objective 1 having a correction group 2 are described below.

All of the designs described below have an object-side numerical aperture of 0.8, an imaging scale of −25× and an object field with a diameter of 0.720 mm. This should not be understood to be limiting. All the stated parameters can also have different values.

All of the immersion objectives 1 described below have been corrected in a spectrally broadband manner. They have been corrected, for example, in the wavelength range from 480 nm to 850 nm.

The immersion objectives 1 described below should be used in principle with an immersion medium. Typical immersion media and the refractive indices thereof for wavelengths of 480 nm, 546 nm and 850 nm are given in table 1.

TABLE 1

Refractive indices of different immersion media for different wavelengths

| | $n_{480}$ | $n_{546}$ | $n_{850}$ |
|---|---|---|---|
| Water | 1.337167 | 1.334193 | 1.326855 |
| Silicone oil | 1.410422 | 1.406366 | 1.39831 |
| Glycerol | 1.459507 | 1.455671 | 1.447288 |
| Immersion oil | 1.523668 | 1.517984 | 1.507114 |

A first variant of an immersion objective 1 will be described below with reference to FIG. 1.

After a change of the immersion medium in the case of the immersion objective 1 according to FIG. 1, the resulting defocus over the working distance is set. The working distance of the immersion objective 1 according to FIG. 1 lies in the range from 0.6 mm to 0.87 mm, depending on the immersion medium used.

The working distance (AA) of the immersion objective 1 is given in table 2 for different immersion media and for the use with or without a cover glass (CG). Table 2 additionally indicates the distances between the lenses L2 and L3 (d4) and the lenses L3 and L4 (d6), and the distance (d18) between the last lens L10 of the immersion objective 1 and the contact surface in the collimated infinity space between the immersion objective 1 and the tube lens for prescribed positions of the correction group 2 for eight different configurations. The combination of the immersion media with/without a cover glass is denoted below in accordance with the numbering of the configuration used here.

TABLE 2

Prescribed positions of the correction group for different configurations

| Configuration | Immersion medium | Cover glass (CG) | AA [mm] | d4 [mm] | d6 [mm] | d18 [mm] |
|---|---|---|---|---|---|---|
| 1 | Water | Yes | 0.600000 | 0.099632 | 3.605443 | 0.868677 |
| 2 | Water | No | 0.744802 | 0.083474 | 3.756895 | 0.758683 |
| 3 | Glycerol | No | 0.827475 | 0.141959 | 3.208700 | 1.165055 |
| 4 | Glycerol | Yes | 0.666646 | 0.147192 | 3.159649 | 1.199808 |
| 5 | Silicone | No | 0.794274 | 0.121357 | 3.401806 | 1.025885 |
| 6 | Silicone | Yes | 0.666646 | 0.130461 | 3.316469 | 1.086565 |
| 7 | Immersion oil | No | 0.869853 | 0.168789 | 2.957204 | 1.34707 |
| 8 | Immersion oil | Yes | 0.700800 | 0.168768 | 2.957408 | 1.346128 |

The immersion objective 1 has ten lenses L1 to L10. The optical design data of the lenses are summarized in table 3.

TABLE 3

Optical design data of the objective according to FIG. 1

| | Surface (Fl) | Radius [mm] | Thickness [mm] | Material | $n_{546}$ | $n_{365}$ | $n_{850}$ | Half diameter [mm] |
|---|---|---|---|---|---|---|---|---|
| CG | 0 | ∞ | 0.170000 | N-K5 | 1.524583 | 1.544127 | 1.515107 | 0.80 |
| AA | 1 | ∞ | 0.600000 | Water | 1.334190 | 1.346757 | 1.326855 | 0.80 |
| L1 | 2 | ∞ | 1.989171 | N-FK5 | 1.489143 | 1.504009 | 1.481404 | 0.80 |
| L2 | 3 | −1.335161 | 4.605033 | S-LAH58 | 1.888145 | 1.939182 | 1.865804 | 1.32 |
| | 4 | −4.785539 | 0.099632 | | | | | 4.34 |
| L3 | 5 | 25.715407 | 2.653813 | N-PK51 | 1.530193 | 1.545274 | 1.522811 | 5.99 |
| | 6 | −20.024029 | 3.605443 | | | | | 6.16 |
| L4 | 7 | 8.989651 | 3.195437 | S-TIL1 | 1.550984 | 1.579591 | 1.538490 | 7.13 |
| | 8 | 11.830204 | 2.281269 | | | | | 6.58 |

TABLE 3-continued

Optical design data of the objective according to FIG. 1

| | Surface (Fl) | Radius [mm] | Thickness [mm] | Material | $n_{546}$ | $n_{365}$ | $n_{850}$ | Half diameter [mm] |
|---|---|---|---|---|---|---|---|---|
| L5 | 9 | 135.977057 | 1.113925 | N-KZFS11 | 1.641325 | 1.676362 | 1.625462 | 6.50 |
| L6 | 10 | 6.985893 | 5.114958 | S-FPL53 | 1.439854 | 1.449862 | 1.434820 | 5.96 |
| | 11 | −20.404137 | 0.099516 | | | | | 6.04 |
| L7 | 12 | 19.940955 | 5.509717 | N-PK51 | 1.530193 | 1.545274 | 1.522811 | 5.99 |
| L8 | 13 | −6.840815 | 0.998484 | N-KZFS11 | 1.641325 | 1.676362 | 1.625462 | 5.85 |
| | 14 | −97.373462 | 0.099790 | | | | | 5.93 |
| L9 | 15 | 15.076736 | 7.758107 | S-LAH64 | 1.791960 | 1.830167 | 1.774401 | 5.92 |
| | 16 | 9.101629 | 5.330806 | | | | | 4.49 |
| L10 | 17 | −6.321406 | 2.466643 | S-FTM16 | 1.596669 | 1.639749 | 1.579677 | 4.73 |
| | 18 | −6.825204 | 0.868677 | | | | | 5.54 |
| | 19 | ∞ | 0.000000 | | | | | 5.65 |
| TUBE | 20 | ∞ | 126.500000 | | | | | 5.65 |
| | 21 | 189.417000 | 10.900000 | N-BALF4 | 1.582122 | 1.606583 | 1.570691 | 19.90 |
| | 22 | −89.417000 | 60.000000 | | | | | 19.90 |
| | 23 | ∞ | 80.000000 | BK7 | 1.518722 | 1.536270 | 1.509840 | 11.66 |
| | 24 | ∞ | 48.200000 | | | | | 10.31 |
| | 25 | ∞ | 0.000000 | | | | | 9.09 |
| | 26 | ∞ | 0.000000 | | | | | 9.11 |

In addition to the optical design data of the lenses L1 to L10 of the immersion objective 1, table 3 also includes the optical design data of the tube (F120 to F126).

The immersion objective 1 has ten lenses L1 to L10. The figures additionally each show a cover glass CG. The immersion objective 1 can be used with or without the cover glass CG. In this case, the working distance changes.

The lenses L5 and L6 and also the lenses L7 and L8 respectively form a cemented doublet element.

The lens L3 forms the correction group 2. The lens L3 is displaceable along the optical axis oA. It has a variable distance from the lens L2. It has a variable distance from the lens L4. The displacement of the correction group 2, that is to say of the lens L3, is such that the changes in distance between the lenses L2 and L3 (Δd4) and the distance between the lenses L3 and L4 (Δd6) are proportional to one another. The proportionality constant α has the value −9.373: Δd6=−9.373Δd4.

When displacing the correction group 2, the aberrations of the immersion objective 1 change, mainly for the image point on the optical axis oA. Primarily, spherical aberration occurs and, to a certain degree, defocus aberration, which is also simply referred to as defocus. The defocus aberration is described below by way of the aberration in the wavefront, such as by the Zernike coefficient Z4. This description is independent of the type of image formation. The spherical aberration is expressed correspondingly by Zernike coefficients. Z9 is a measure of the lowest-order (third-order) spherical aberration. Z16 and Z25 serve for characterizing higher-order spherical aberration.

Table 4 contains the specifications relating to the amount by which the distance d4 and the distance d6 of the correction group 2 from the lenses L2 and L4, which are adjacent on the object side and image side respectively, are changed as compared to the configuration "Immersion medium water and use of a cover glass made of the material N-K5" with a thickness of 170 μm for setting the optimum prescribed position. The setting of the immersion objective 1, in particular the displacement position of the correction group 2 for this configuration (water and cover glass), is also referred to as the main position of the immersion objective 1.

In addition, table 4 indicates the changes in the Zernike coefficients Z4, Z9, Z16 and Z25 of an axis point that are brought about in the case of an increase of the distance d4 by 1 μm and a simultaneous reduction in the distance d6 by 9.373 μm in the respective configuration.

TABLE 4

Sensitivities of selected Zernike coefficients in the case of a displacement of the correction group such that d4 is increased by 1 μm, d6 is decreased by 9.373 μm.

| Configuration | AA [mm] | Δd4 [mm] | Δd6 [mm] | $Z4_{sens} = \delta Z4/\delta d4$ [nm/μm] | $Z9_{sens} = \delta Z9/\delta d4$ [nm/μm] | $Z16_{sens} = \delta Z16/\delta d4$ [nm/μm] | $Z25_{sens} = \delta Z25/\delta d4$ [nm/μm] |
|---|---|---|---|---|---|---|---|
| 1 | 0.600 | 0.000 | 0.000 | 0.058 | −11.604 | −1.085 | −0.084 |
| 2 | 0.745 | −0.016 | 0.151 | 0.123 | −11.750 | −1.101 | −0.088 |
| 3 | 0.828 | 0.042 | −0.397 | −0.123 | −11.233 | −1.044 | −0.075 |
| 4 | 0.667 | 0.048 | −0.446 | −0.146 | −11.188 | −1.039 | −0.074 |
| 5 | 0.794 | 0.022 | −0.204 | −0.033 | −11.411 | −1.064 | −0.079 |
| 6 | 0.640 | 0.031 | −0.289 | −0.072 | −11.332 | −1.055 | −0.077 |
| 7 | 0.870 | 0.069 | −0.648 | −0.246 | −11.006 | −1.019 | −0.070 |
| 8 | 0.701 | 0.069 | −0.648 | −0.246 | −11.006 | −1.019 | −0.070 |

Table 4 shows that in the case of a displacement of the correction group 2, practically no defocus (Z4) but significant third-order spherical aberrations (Z9) and higher-order spherical aberrations (Z16, Z25) occur. In other words: The correction group 2 makes a correction of the spherical aberration possible without this producing a significant defocus (Z4).

In other words, in the case of a displacement of the correction group 2, the spherical aberration (Z9, Z16, Z25) strongly dominates the defocus term (Z4). This ensures the constancy of the focus upon actuation of the correction mechanism is maintained for all intended settings.

It is furthermore apparent that the sensitivities are substantially independent of the configuration (i.e. type of the immersion and presence of a cover glass).

The sensitivity of Z9 is great compared to the sensitivity of Z4. In general, the following applies: $|Z9_{sens}|>|Z4_{sens}|$ (e.g., $|Z9_{sens}|>10|Z4_{sens}|$, $|Z9_{sens}|>20|Z4_{sens}|$, $|Z9_{sens}|>50|Z4_{sens}|$, $|Z9_{sens}|>100|Z4_{sens}|$, $Z9_{sens}|>200|Z4_{sens}|$). These specifications can relate to configuration 1 (water and cover glass).

The defocus brought about by the change in the immersion/cover glass combination can be compensated easily by focusing, i.e. actuating the focus drive of the microscope. During focusing, either the immersion objective 1 or the microscope stage with the object that is to be imaged can be moved.

Owing to the small ratio of the sensitivities of Z4 and Z9 of the displacement position of the correction group 2, the correction mechanism can then be actuated for correcting any remaining spherical aberration without this leading to an appreciable new defocus.

The method for setting the microscope, such as for adapting the microscope to changes in the object space, such as for adapting the microscope to a change of the immersion medium, is described below with reference to FIGS. 2A and 2C.

Figure 2A:
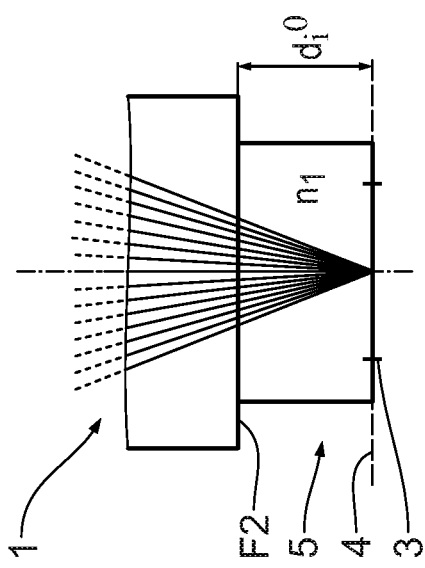
Figure 2C:
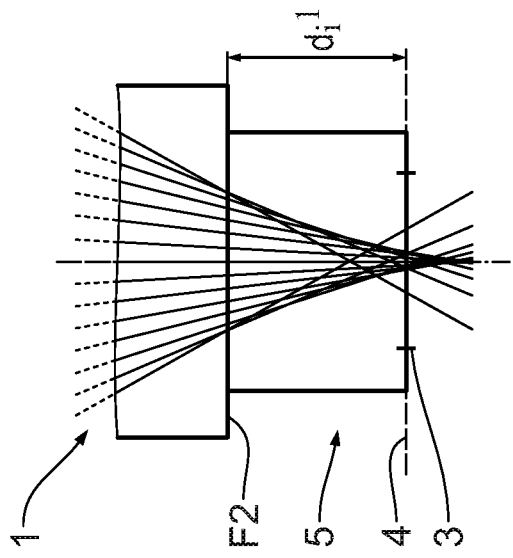

FIG. 2A shows the starting situation when using a first immersion medium having a refractive index $n_1$. The immersion objective 1, of which the figure indicates, again merely schematically, only the object-side end, is focused at a point in the object field 3 in an object plane 4. In this case, the immersion objective 1 has a working distance $d_i^0$.

The region between the object plane 4 and the frontmost surface (F2) of the immersion objective 1 is called the object space 5. Typically, an immersion medium with a refractive index n is arranged in the object space 5 when using the immersion objective 1. Depending on the desired properties, a cover glass (CG) having a thickness and a refractive index can also be arranged in the object space 5. A typical thickness of the cover glass is 170 μm. The cover glass can be made from N-K5, for example. At a wavelength of 480 nm, it can have a refractive index of 1.524583.

A change of the immersion medium to an immersion medium with the refractive index $n_2$ involves an adaptation of the immersion objective 1. In the case of such a change of the immersion medium, the immersion objective 1 can be pre-set to the new immersion medium by way of a displacement of the correction group 2. The immersion objective 2 for this purpose preferably has a plurality of prescribed positions. Such prescribed positions can be characterized, for example, by markers on the objective. Reference is made in this respect to DE 10 2004 051 357 B4 and DE 10 2006 052 142 B4.

The perfectly adapted state is shown schematically in FIG. 2B. The immersion objective 1 now has a new working distance $d_i^1$. In other words, the working distance $d_i$ of the immersion objective 1 is dependent on the (prescribed) position of the correction group 2. The change in the working distance is possible by focusing, that is to say by a relative displacement of the immersion objective 1 with respect to the object plane 4 with the aid of the focus drive of the microscope.

In the general case, the situations in the object space 5 can deviate from the prescribed values. In this case, the spherical aberration has not yet been optimally compensated, in particular has not yet been completely compensated, after setting the correction group 2 to the new prescribed position and focusing of the immersion objective 1. This situation is shown schematically in FIG. 2C.

In the case of the optical design of the immersion objective 1 according to FIG. 1, however, this does not lead to a change in the focal position, at least not to any appreciable extent. This can be seen in the example shown schematically in FIG. 2C in the fact that light rays from the aperture periphery and from the aperture zone meet on mutually opposite sides of the object plane 4.

By displacing the correction group 2, in particular by finely adjusting the displacement position thereof, the spherical aberration can be reduced, preferably be at least compensated as far as possible (FIG. 2B) without this resulting in a significant shift of the focal position. By reducing the spherical aberration, the image contrast can be increased.

After prescription of a specific configuration, that is to say of the properties in the object space 5, in particular prescription of the refractive index of the immersion medium used and prescription of whether or not a cover glass is used and possibly what thickness and refractive index the cover glass has, and corresponding pre-setting of the correction group 2, the immersion objective 1 according to FIG. 1 can be set in a simple two-stage method for optimizing the image quality. Here, first focusing is performed with the aid of the focus drive of the microscope. Next, the spherical aberration is reduced by finely setting the displacement position of the correction group 2 and the image contrast is increased thereby. The focusing and/or the contrast maximization can take place in automated fashion. For this purpose, the microscope can be provided with a control device and suitable sensors.

A variant of the immersion objective 1 will be described below with reference to FIG. 3.

Certain details of this variant correspond to those of the objective according to FIG. 1, with reference hereby being made to the description thereof.

Figure 3:
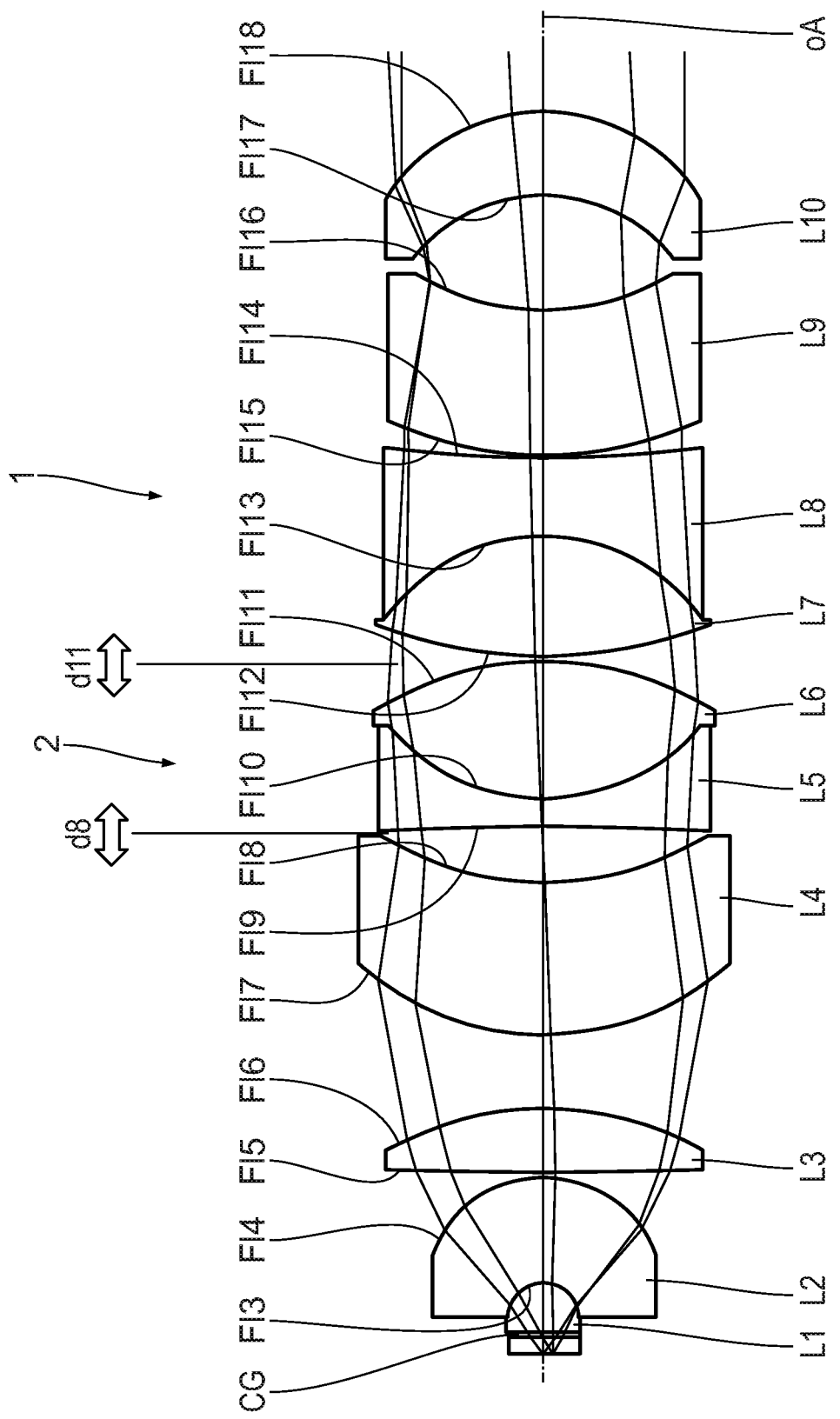

In the immersion objective 1 according to FIG. 3, the correction group 2 includes the cemented doublet element with the lenses L5 and L6.

When the correction group 2 is displaced, the distances d8 from the lens L4 that is adjacent on the object side and d11 from the lens L7 that is adjacent on the image side are changed. The distance change in these distances is proportional. The proportionality constant α is −1.344: $\Delta d11 = -1.344 \Delta d8$.

The optical data of the immersion objective 1 according to FIG. 3 are summarized in table 5.

Corresponding to table 2, table 6 summarizes some of the optical data of the prescribed positions for the different configurations.

TABLE 5

Optical design data of the objective according to FIG. 3

| Configuration | Immersion medium | CG | AA [mm] | d8 [mm] | d11 [mm] | d18 [mm] |
|---|---|---|---|---|---|---|
| 1 | Water | Yes | 0.600000 | 2.107503 | 0.205535 | 2.246009 |
| 2 | Water | No | 0.744919 | 2.197234 | 0.084929 | 2.302136 |
| 3 | Glycerol | No | 0.827661 | 1.867890 | 0.527596 | 2.105492 |
| 4 | Glycerol | Yes | 0.666689 | 1.838487 | 0.567116 | 2.086285 |
| 5 | Silicone | No | 0.794431 | 1.988076 | 0.366055 | 2.180234 |
| 6 | Silicone | Yes | 0.639911 | 1.936273 | 0.435684 | 2.146846 |
| 7 | Immersion oil | No | 0.870073 | 1.727977 | 0.715653 | 2.014574 |
| 8 | Immersion oil | Yes | 0.700858 | 1.726277 | 0.717937 | 2.013225 |
| PV value | | | | 0.470957 | 0.633008 | 0.288911 |

TABLE 6

Prescribed positions of the correction group for different configurations

| | Surface (Fl) | Radius [mm] | Thickness [mm] | Material | $n_{546}$ | $n_{365}$ | $n_{850}$ | Half diameter [mm] |
|---|---|---|---|---|---|---|---|---|
| CG | 0 | ∞ | 0.170000 | N-K5 | 1.524583 | 1.544127 | 1.515107 | 0.80 |
| | 1 | ∞ | 0.600000 | Water | 1.334190 | 1.346757 | 1.326855 | 0.80 |
| L1 | 2 | ∞ | 1.883086 | N-FK5 | 1.489143 | 1.504009 | 1.481404 | 0.80 |
| L2 | 3 | −1.307214 | 3.969105 | S-LAH58 | 1.888145 | 1.939182 | 1.865804 | 1.29 |
| | 4 | −4.385572 | 0.097937 | | | | | 3.92 |
| L3 | 5 | 117.474093 | 2.437249 | N-PK51 | 1.530193 | 1.545274 | 1.522811 | 5.18 |
| | 6 | −11.831944 | 2.703312 | | | | | 5.45 |
| L4 | 7 | 10.239040 | 5.719627 | S-TIL1 | 1.550984 | 1.579591 | 1.538490 | 6.51 |
| | 8 | 11.294919 | 2.107503 | | | | | 5.65 |
| L5 | 9 | −108.960802 | 0.993547 | N-KZFS11 | 1.641325 | 1.676362 | 1.625462 | 5.67 |
| L6 | 10 | 7.595830 | 5.127040 | N-PK51 | 1.530193 | 1.545274 | 1.522811 | 5.82 |
| | 11 | −11.971971 | 0.205535 | | | | | 5.94 |
| L7 | 12 | 17.340409 | 4.452998 | N-PK51 | 1.530193 | 1.545274 | 1.522811 | 5.76 |
| L8 | 13 | −7.257071 | 2.893171 | N-KZFS11 | 1.641325 | 1.676362 | 1.625462 | 5.64 |
| | 14 | 37.431933 | 0.099906 | | | | | 5.34 |
| L9 | 15 | 13.195415 | 5.437993 | N-LAF35 | 1.746883 | 1.781081 | 1.730919 | 5.35 |
| | 16 | 8.837864 | 4.305595 | | | | | 4.38 |
| L10 | 17 | −6.119887 | 3.110778 | S-FTM16 | 1.596669 | 1.639749 | 1.579677 | 4.53 |
| | 18 | −6.906536 | 2.246009 | | | | | 5.58 |
| | 19 | ∞ | 0.000000 | | | | | 5.63 |
| TUBE | 20 | ∞ | 126.500000 | | | | | 5.65 |
| | 21 | 189.417000 | 10.900000 | N-BALF4 | 1.582122 | 1.606583 | 1.570691 | 19.90 |
| | 22 | −189.417000 | 60.000000 | | | | | 19.90 |
| | 23 | ∞ | 80.000000 | BK7 | 1.518722 | 1.536270 | 1.509840 | 9.53 |
| | 24 | ∞ | 48.200000 | | | | | 9.14 |
| | 25 | ∞ | 0.000000 | | | | | 9.09 |
| | 26 | ∞ | 0.000000 | | | | | 9.12 |

TABLE 7

Sensitivities of selected Zernike coefficients in the case of a displacement of the correction group such that d8 is increased by 1 μm, d11 is decreased by 1.344 μm.

| Configuration | AA | Δd8 | Δd11 | $Z4_{sens} = \delta Z4/\delta d8$ [nm/μm] | $Z9_{sens} = \delta Z9/\delta d8$ [nm/μm] | $Z16_{sens} = \delta Z16/\delta d8$ [nm/μm] | $Z25_{sens} = \delta Z25/\delta d8$ [nm/μm] |
|---|---|---|---|---|---|---|---|
| 1 | 0.600 | 0.000 | 0.000 | −0.007 | 2.125 | 0.225 | −0.010 |
| 2 | 0.745 | 0.090 | −0.121 | 0.026 | 2.146 | 0.225 | −0.011 |
| 3 | 0.828 | −0.240 | 0.322 | −0.093 | 2.072 | 0.226 | −0.007 |
| 4 | 0.667 | −0.269 | 0.362 | −0.103 | 2.065 | 0.226 | −0.007 |
| 5 | 0.794 | −0.119 | 0.161 | −0.050 | 2.098 | 0.225 | −0.009 |
| 6 | 0.640 | −0.171 | 0.230 | −0.068 | 2.087 | 0.225 | −0.008 |
| 7 | 0.870 | −0.380 | 0.510 | −0.141 | 2.041 | 0.226 | −0.006 |
| 8 | 0.701 | −0.381 | 0.512 | −0.142 | 2.040 | 0.226 | −0.006 |

Corresponding to table 4, table 7 gives, by way of example, the change in the Zernike coefficients Z4, Z9, Z16 and Z25 during a displacement of the correction group such that the distance d8 from the lens that is adjacent on the object side changes by 1 μm.

A variant of the immersion objective 1 will be described below with reference to FIG. 4.

Certain details of this variant correspond to those of the objective according to FIG. 1, with reference hereby being made to the description thereof.

Figure 4:
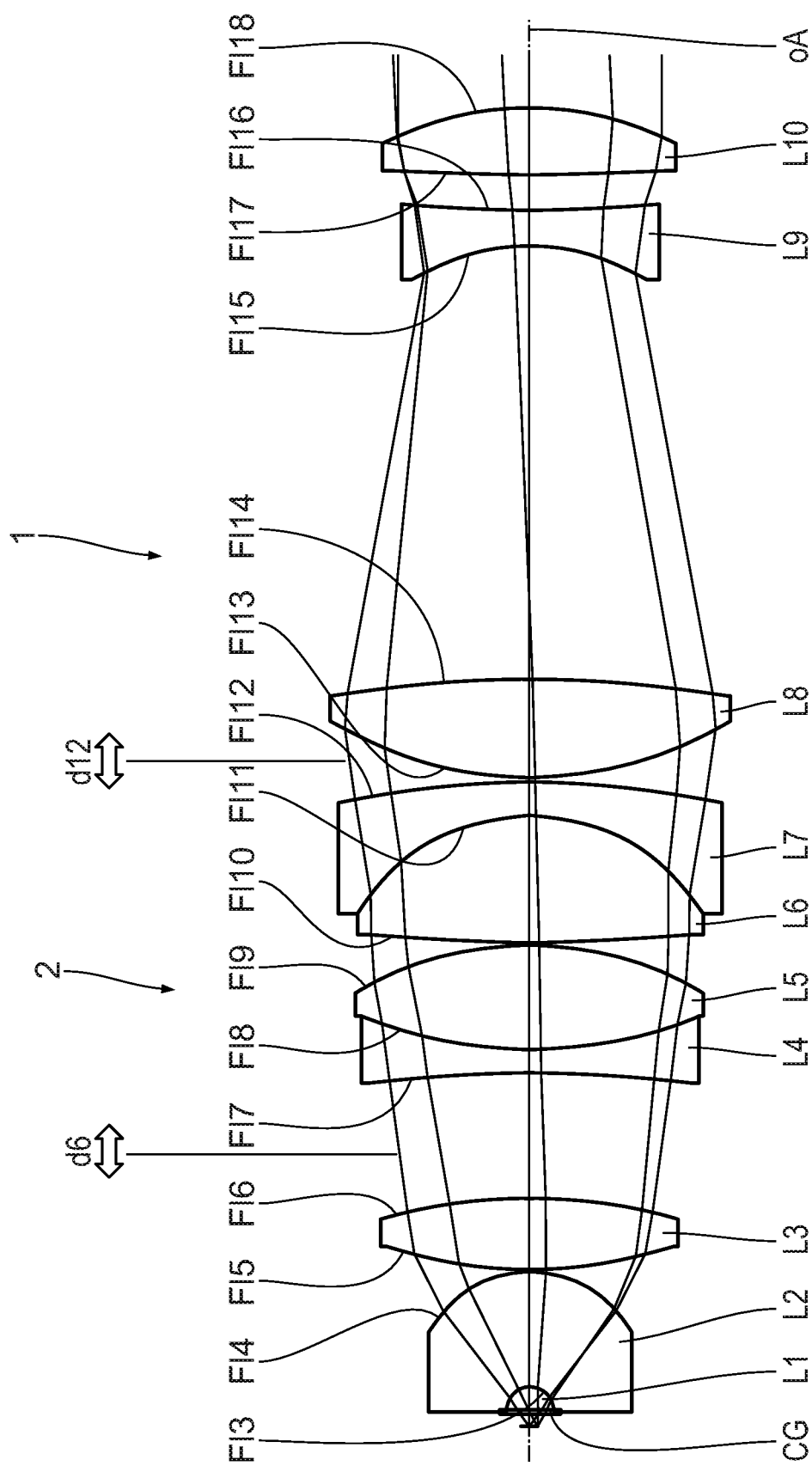

In the immersion objective 1 according to FIG. 4, the correction group 2 includes two cemented doublet elements with the lenses L4, L5 and L6, L7.

When the correction group 2 is displaced, the distances d6 from the lens L3 that is adjacent on the object side and d12 from the lens L8 that is adjacent on the image side are changed. The distance change in these distances is proportional. The proportionality constant α is −1: Δd12=−Δd6. This is particularly advantageous because this means that, during a displacement of the correction group 2, all remaining lenses L1 to L3 and L8 to L10 remain fixed in place relative to one another. In this way, the construction outlay for the mechanical design of the immersion objective 1 is significantly reduced.

The optical data of the immersion objective 1 according to FIG. 4 are summarized in table 8.

TABLE 8

Optical design data of the objective according to FIG. 4

| | Surface (FI) | Radius [mm] | Thickness [mm] | Material | $n_{546}$ | $n_{365}$ | $n_{850}$ | Half diameter [mm] |
|---|---|---|---|---|---|---|---|---|
| CG | 0 | ∞ | 0.170000 | D263M | 1.525589 | 1.547406 | 1.515270 | 0.80 |
| | 1 | ∞ | 0.600000 | Water | 1.334190 | 1.346757 | 1.326855 | 0.80 |
| L1 | 2 | ∞ | 0.968399 | N-FK5 | 1.489143 | 1.504009 | 1.481404 | 0.83 |
| L2 | 3 | −1.054497 | 5.061973 | S-LAH58 | 1.888145 | 1.939182 | 1.865804 | 0.99 |
| | 4 | −4.998689 | 0.099634 | | | | | 4.14 |
| L3 | 5 | 19.963237 | 3.098229 | S-PHM53 | 1.605199 | 1.625474 | 1.595229 | 5.78 |
| | 6 | −24.089702 | 5.522361 | | | | | 6.01 |
| L4 | 7 | −58.094865 | 1.000000 | N-KZFS11 | 1.641325 | 1.676362 | 1.625462 | 6.62 |
| L5 | 8 | 19.689147 | 4.581070 | CAFUV | 1.434942 | 1.444913 | 1.430041 | 6.91 |
| | 9 | −14.655434 | 0.099854 | | | | | 7.18 |
| L6 | 10 | 76.205405 | 5.517322 | CAFUV | 1.434942 | 1.444913 | 1.430041 | 7.03 |
| L7 | 11 | −8.840077 | 1.500000 | N-KZFS11 | 1.641325 | 1.676362 | 1.625462 | 7.25 |
| | 12 | −39.648516 | 0.180389 | | | | | 7.93 |
| L8 | 13 | 16.516752 | 4.364122 | CAFUV | 1.434942 | 1.444913 | 1.430041 | 8.33 |
| | 14 | −50.344026 | 18.948425 | | | | | 8.20 |
| L9 | 15 | −9.273566 | 1.500000 | S-LAM3 | 1.720563 | 1.755314 | 1.704937 | 4.70 |
| | 16 | 55.567645 | 1.566624 | | | | | 5.13 |
| L10 | 17 | 117.199711 | 2.980259 | S-FTM16 | 1.596669 | 1.639749 | 1.579677 | 5.64 |
| | 18 | −13.363861 | 2.241377 | | | | | 5.95 |
| | 19 | ∞ | 0.000000 | N-FK5 | 1.489143 | 1.504009 | 1.481404 | 6.13 |
| | 20 | ∞ | 0.000000 | | | | | 6.13 |
| | 21 | ∞ | 0.000000 | | | | | 6.13 |
| TUBE | 22 | ∞ | 15.000000 | | | | | 6.13 |
| | 23 | ∞ | 150.000000 | | | | | 6.89 |
| | 24 | 175.086000 | 5.500000 | S-FPL51 | 1.498454 | 1.511762 | 1.491855 | 14.52 |
| | 25 | −64.939400 | 3.200000 | S-BAH10 | 1.673402 | 1.706632 | 1.658578 | 14.54 |
| | 26 | −124.100700 | 60.000000 | | | | | 14.66 |
| | 27 | ∞ | 20.000000 | N-BK7 | 1.518722 | 1.536270 | 1.509840 | 12.74 |
| | 28 | ∞ | 104.980350 | | | | | 12.33 |
| | 29 | ∞ | 0.000000 | | | | | 9.06 |
| | 30 | 0 | 0 | | | | | 9.124 |

Corresponding to table 4, table 9 summarizes some of the optical data of the prescribed positions for the different configurations.

TABLE 9

Prescribed positions of the correction group for different configurations

| Configuration | Immersion medium | CG | AA [mm] | d6 [mm] | d12 [mm] | d18 [mm] |
|---|---|---|---|---|---|---|
| 1 | Water | Yes | 0.600000 | 5.522361 | 0.180389 | 2.241377 |
| 2 | Water | No | 0.744802 | 5.603434 | 0.099316 | 2.266586 |
| 3 | Glycerol | No | 0.827475 | 5.312800 | 0.389947 | 2.183928 |
| 4 | Glycerol | Yes | 0.666646 | 5.286577 | 0.416171 | 2.174747 |
| 5 | Silicone | No | 0.794274 | 5.416678 | 0.286072 | 2.217078 |
| 6 | Silicone | Yes | 0.639890 | 5.370336 | 0.332413 | 2.201467 |
| 7 | Immersion oil | No | 0.869853 | 5.184382 | 0.518368 | 2.141429 |
| 8 | Immersion oil | Yes | 0.700800 | 5.182151 | 0.520599 | 2.140488 |
| PV value | | | | 0.421283 | 0.421283 | 0.126098 |

TABLE 10

Sensitivities of selected Zernike coefficients during a displacement of the correction group such that the distance d6 from the lens that is adjacent on the object side changes by 1 μm.

| Configuration | AA | Δd6 | Δd12 | $Z4_{sens} = \delta Z4/\delta d6$ [nm/μm] | $Z9_{sens} = \delta Z9/\delta d6$ [nm/μm] | $Z16_{sens} = \delta Z16/\delta d6$ [nm/μm] | $Z25_{sens} = \delta Z25/\delta d6$ [nm/μm] |
|---|---|---|---|---|---|---|---|
|   | 0.600 | 0.000  | 0.000  |  0.055 | 2.382 | 0.276 | 0.032 |
| 2 | 0.745 | 0.081  | −0.081 |  0.090 | 2.405 | 0.280 | 0.032 |
| 3 | 0.827 | −0.210 | 0.210  | −0.035 | 2.323 | 0.266 | 0.030 |
| 4 | 0.667 | −0.236 | 0.236  | −0.046 | 2.315 | 0.264 | 0.030 |
| 5 | 0.794 | −0.106 | 0.106  |  0.009 | 2.352 | 0.271 | 0.031 |
| 6 | 0.640 | −0.152 | 0.152  | −0.010 | 2.339 | 0.268 | 0.031 |
| 7 | 0.870 | −0.338 | 0.338  | −0.089 | 2.287 | 0.260 | 0.029 |
| 8 | 0.701 | −0.340 | 0.340  | −0.090 | 2.286 | 0.259 | 0.029 |

Corresponding to table 4, table 10 gives, by way of example, the change in the Zernike coefficients Z4, Z9, Z16 and Z25 during a displacement of the correction group such that the distance d6 from the lens that is adjacent on the object side changes by 1 μm.

What is claimed is:

1. An objective, comprising:
a plurality of lenses arranged along an optical axis of the objective,
wherein:
the objective is an immersion objective;
the objective comprises a correction group which comprises at least one of the plurality of lenses;
the correction group is displaceable along the optical axis;
the objective has a working distance that is dependent on at least one member selected from the group consisting of an immersion medium and a cover glass that may be used;
aberrations of a wavefront coming from an axis point are describable by Zernike polynomials with Zernike coefficients;
the Zernike coefficient Z4 has a sensitivity $Z4_{sens}$ with respect to a displacement of the correction group along the optical axis;
the Zernike coefficient Z9 has a sensitivity $Z9_{sens}$ with respect to the displacement of the correction group along the optical axis; and $|Z4_{sens}{:}Z9_{sens}|<1$.

2. The objective of claim 1, wherein:
the Zernike coefficient Z16 has a sensitivity $Z16_{sens}$ with respect to the displacement of the correction group along the optical axis; and $|Z4_{sens}{:}Z16_{sens}|<1$.

3. The objective of claim 1, wherein:
the Zernike coefficient Z25 has a sensitivity $Z25_{sens}$ with respect to the displacement of the correction group along the optical axis; and $|Z4_{sens}{:}Z25_{sens}|<4$.

4. The objective of claim 1, wherein $|Z4_{sens}|<1$ nm/μm.
5. The objective of claim 1, wherein:
the plurality of lenses comprises a lens that is adjacent an object side of the correction group and a lens adjacent to an image side of the correction group;
a distance of the correction group from the lens adjacent on the object side is changeable; and
a distance of the correction group from the lens that is adjacent on the image side is changeable.

6. The objective of claim 5, wherein, when the correction group is displaced along the optical axis, a change in the distance of the correction group from the lens that is adjacent on the object side is proportional to a change in the distance of the correction group from the lens that is adjacent on the image side.

7. The objective of claim 6, wherein, when the correction group is displaced along the optical axis, only lenses of the correction group are displaced and all other lenses of the immersion objective remain fixed relative to one another.

8. The objective of claim 5, wherein, when the correction group is displaced along the optical axis, only lenses of the correction group are displaced and all other lenses of the immersion objective remain fixed relative to one another.

9. The objective of claim 1, wherein, when the correction group is displaced along the optical axis, only lenses of the correction group are displaced and all other lenses of the immersion objective remain fixed relative to one another.

10. The objective of claim 1, wherein:
the Zernike coefficient Z16 has a sensitivity $Z16_{sens}$ with respect to the displacement of the correction group along the optical axis;

$|Z4_{sens}{:}Z16_{sens}|<1$;

the Zernike coefficient Z25 has a sensitivity $Z25_{sens}$ with respect to the displacement of the correction group along the optical axis; and $|Z4_{sens}{:}Z25_{sens}|<4$.

11. The objective of claim 10, wherein $|Z4sens|<1$ nm/μm.

12. The objective of claim 11, wherein, when the correction group is displaced along the optical axis, only lenses of the correction group are displaced and all other lenses of the immersion objective remain fixed relative to one another.

13. The objective of claim 10, wherein, when the correction group is displaced along the optical axis, only lenses of the correction group are displaced and all other lenses of the immersion objective remain fixed relative to one another.

14. The objective of claim 1, wherein:
the Zernike coefficient Z16 has a sensitivity $Z16_{sens}$ with respect to the displacement of the correction group;

$|Z4_{sens}{:}Z9_{sens}|<1$; and $|Z4_{sens}|<1$ nm/μm.

15. The objective of claim 14, wherein, when the correction group is displaced along the optical axis, only lenses of the correction group are displaced and all other lenses of the immersion objective remain fixed relative to one another.

16. The objective of claim 1, wherein:
   the plurality of lenses comprises a lens that is adjacent an object side of the correction group and a lens adjacent to an image side of the correction group; and
   a distance of the correction group from the lens adjacent on the object side is changeable.

17. The objective of claim 1, wherein the working distance of the objective is dependent on an immersion medium.

18. The objective of claim 1, further comprising a cover glass, wherein the working distance of the objective is dependent on the cover glass.

19. A microscope, comprising:
   an objective according to claim 1.

20. A method of setting a microscope which comprises a focus drive and an immersion objective comprising a correction group, the method comprising:
   positioning the correction group to pre-set the immersion objective;
   actuating the focus drive to reduce a defocus aberration;
   displacing the correction group to reduce a spherical aberration without increasing the defocus aberration by more than 10%.

21. The method of claim 20, wherein the method is performed in an automated fashion.

* * * * *

UNITED STATES PATENT AND TRADEMARK OFFICE
CERTIFICATE OF CORRECTION

PATENT NO. : 11,703,674 B2
APPLICATION NO. : 16/933735
DATED : July 18, 2023
INVENTOR(S) : Alexander Epple It is certified that error appears in the above-identified patent and that said Letters Patent is hereby corrected as shown below:

On the Title Page

Column 1, Line 1, Item (73), delete "Microscopy," insert -- Microscopy GmbH --.

In the Specification

Column 1, Line 61, delete "|<0.02)," insert -- |<0.02), $Zi_{sens}$ --.

Column 3, Line 48, delete "$Z25_{sens}<4$" insert -- $Z25_{sens}$ |<4 --.

Column 3, Line 48, delete "(e.g." insert -- (e.g., --.

Column 5, Line 9, delete "FIG." insert -- FIGS. --.

Column 9, Line 10, delete "| $Z4_{sens}$" insert -- | $Z4_{sens}$ | --.

Column 9, Line 11, delete "| $Z9_{sens}$ > 10 |$Z4_{sens}$ |," insert -- | $Z9_{sens}$ | > 10 |$Z4_{sens}$|, --.

Column 9, Line 12, delete "| $Z9_{sens}$| > 50 | $Z4_{sens}$," insert -- | $Z9_{sens}$| > 50 | $Z4_{sens}$ |, --.

Column 9, Line 13, delete "$Z9_{sens}$ | >" insert -- | $Z9_{sens}$ | > --.

In the Claims

Column 16, Line 49, Claim 11, delete "| Z4sens | < 1" insert -- | $Z4_{sens}$ | < 1 --.

Column 16, Line 63, Claim 14, delete "$Z9_{sens}$" insert -- $Z16_{sens}$ | --.

Signed and Sealed this
Third Day of October, 2023

*Katherine Kelly Vidal*
Katherine Kelly Vidal
*Director of the United States Patent and Trademark Office*